United States Patent [19]
Palusis et al.

[11] Patent Number: 5,755,093
[45] Date of Patent: May 26, 1998

[54] FORCED AIR COOLED GAS TURBINE EXHAUST LINER

[75] Inventors: Mark E. Palusis, Jupiter; Carlos G. Figueroa, Wellington; Daniel C. Friedberg, Juno Beach; Debora F. Kehret, Jupiter, all of Fla.

[73] Assignee: United Technologies Corporation, Hartford, Conn.

[21] Appl. No.: 431,542

[22] Filed: May 1, 1995

[51] Int. Cl.$^6$ ................... F02K 1/82; F02K 1/00
[52] U.S. Cl. ................... 60/266; 60/752; 60/757; 60/271
[58] Field of Search ................ 60/265, 266, 752, 60/753, 754, 756, 757, 759, 271; 239/265.17

[56] References Cited

U.S. PATENT DOCUMENTS

| | | | |
|---|---|---|---|
| 2,591,676 | 4/1952 | Clayton, Jr. | 60/271 |
| 2,658,337 | 11/1953 | Clarke et al. | 60/757 |
| 2,742,762 | 4/1956 | Kuhring | 60/752 |
| 2,974,486 | 3/1961 | Edwards | 60/266 |
| 3,751,910 | 8/1973 | Sweeney et al. | 60/757 |
| 4,380,906 | 4/1983 | Dierberger | 60/757 |
| 4,749,029 | 6/1988 | Becker et al. | 60/757 |
| 5,079,915 | 1/1992 | Veau | 60/757 |
| 5,388,765 | 2/1995 | Hill et al. | 60/266 |
| 5,419,681 | 5/1995 | Lee | 60/757 |
| 5,592,817 | 1/1997 | Palusis et al. | 60/753 |
| 5,605,046 | 2/1997 | Liang | 60/266 |

FOREIGN PATENT DOCUMENTS

| 57-77827 | 5/1982 | Japan | 60/754 |
|---|---|---|---|

*Primary Examiner*—Timothy Thorpe
*Assistant Examiner*—Ted Kim
*Attorney, Agent, or Firm*—Robert E. Greenstien

[57] ABSTRACT

The exhaust in a gas turbine engine is lined with stacks of hollow cooling blocks made of a composite material. Air is pumped into each stack and escapes into the exhaust flow from a slot between the blocks in each stack. In addition, the blocks contain passages so that some of the airflow escapes to a space between the stacks. The blocks are attached using special fasteners that does not create mechanical stresses on the composite material.

6 Claims, 9 Drawing Sheets

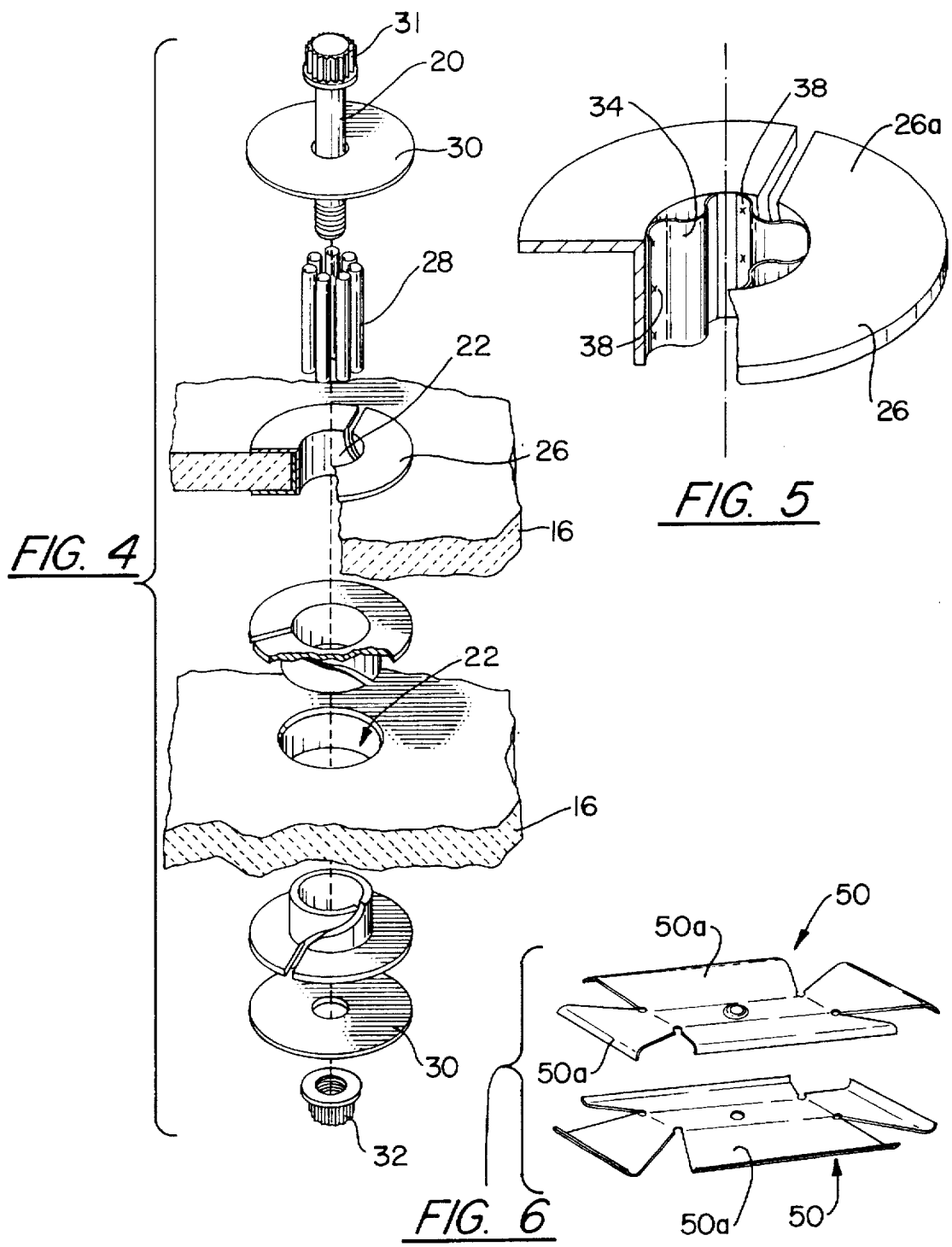

FORCED AIR COOLED GAS TURBINE EXHAUST LINER

CROSS-REFERENCE TO RELATED APPLICATIONS

This application contains material that is shown and claimed in the following co-pending application, which is assigned to the assignee of the this application: ATTACHING BRITTLE COMPOSITE STRUCTURES IN GAS TURBINE ENGINES, filed Dec. 21, 1994, Ser. No. 08/360, 937, now U.S. Pat. No. 5,592,814.

TECHNICAL FIELD

This invention relates to the air cooled liners used in gas turbine engine exhausts, in particular, the use of composite materials for air cooled exhaust liners.

BACKGROUND OF THE INVENTION

In gas turbine engines, barriers or walls, usually called ducted liners, are installed between the hot exhaust gas flow and surrounding engine material and components. To conduct heat effectively and avoid unwanted increases in engine size and weight, these liners are fabricated from thin metal sheets. Air is forced or pumped along one side of the liner to cool it, some of that cooling air bleeding through the liner into the exhaust to cool the surface exposed directly to the exhaust gases.

Physical characteristics of these liners, mainly shape, can inhibit their capacity to conduct heat away from local liner hot spots, which can develop under certain conditions. These liners are exposed to extremely high temperatures, creating unusual thermal expansion characteristics, such as warping and buckling, which may produce hot spots if they restrict cooling air flow through the air metering passages that are often used in current liners.

U.S. Pat. No. 4,887,663, which is assigned to the assignee of this application, and U.S. Pat. No. 4,800,718 illustrate conventional schemes for constructing liners for gas turbine engine exhausts. The liner discussed in U.S. Pat. No. 4,800, 718 is a complex design of the type known to employ "louvers" in air ducts in conjunction with air dams. Those air ducts include an up-stream duct wall that terminates in a downstream edge or lip. A second duct wall is spaced radially outward relative to the first surface lip and defines an elongated louver nozzle through which the cooling air that enters the supply orifices (metering holes) exits. Among the shortcomings of this design philosophy is that the liner can be very expensive to fabricate and repair, owing to the complex design and the number of components. Heat resistant coatings, used in many applications in gas turbine engines for their beneficial thermal and rear resistance, cannot be applied to liners with that design, at least not without seriously risking closing off the downstream lip with coating material, which would restrict cooling air flow through the liner. Reducing the cost and complexity of these liners presents obvious benefits, but being able to coat liners without diminishing cooling efficiency and increasing liner weight offers significant improvement. One way to apply coatings is by "plasma spray." This done in coating some exhaust nozzle parts, for instance, the aft divergent flap. One type of coating particularly suited for this environment is Spec PWA 265 coating by United Technologies Corporation, a two-layer, plasma sprayed coating consisting of a nickel bond layer and a yttrium oxide stabilized zirconium oxide ceramic layer. Coatings increase liner operating life by protecting the liner structure from direct contact with hot/corrosive exhaust gases. Coating also simplifies liner repair. A thermally worn-out or sacrificial liner coating simply may be reapplied instead of replacing the entire liner, the conventional approach at this time.

Those approaches—using coatings—have limited application in the most advanced engine designs that attempt to minimize weight and observability and optimize thrust to weight ratios. These engines often have much higher exhaust temperatures, a fact calling for something other than a coated forced air, cooled ducted liner.

Composite parts and structures are finding ever wider use because of their high strength to weight ratio. Some composites are attractive because they also resist high temperatures and may be less observable by radar. Gas turbine exhaust liners are one environment where these qualities are especially attractive. Ceramic components are especially attractive because they resist the extremely high gas turbine exhaust temperatures, although they do have significantly less strength than pure metal components. Ceramic composites such as Nextel 440/Silica display a rather brittle matrix structure, one that tends to powder when exposed to impact and point loads. That characteristic presents challenges when mounting ceramic matrix components, such as liners in an engine exhaust. A conventional bolt can create extremely high point loads, fracturing the ceramic surface. In other words, the surface can be damaged simply from the compression if a conventional screw bolt is used to fasten the ceramic in place. In addition, vibration produces mechanical loads that generate impact and point loads on the ceramic's surface. Similar loads, created from large differences in thermal expansion, can damage the ceramic. For instance, thermal radial growth by a bolt in a hole or bore in a composite structure can exert substantial forces, producing either or both a crack and bearing failure.

Some of these problems have been considered in other applications in the prior art. For instance, elastomeric bushings are used to reduce noise and vibration, but they are not resistant to high temperatures and do not provide firm support. Washers are used to distribute compression loading, but they can distort, creating high point loads. U.S. Pat. No. 4,834,569 shows a technique in which an insert or bushing is placed in a composite core. U. S. Pat. No. 4,490,083 shows a technique that uses a deformable insert to protect the interface between a fastener and the bore walls. U.S. Pat. No. 4,790,683 shows a method that employs a tolerance ring in conjunction with a relatively soft material to prevent damage (deformation) to the material. However, none of these techniques make a significant contribution towards protecting brittle ceramic composites from all of the forces created by a fastener placed in a high temperature, high vibration environment, such as if found in the exhaust of a gas turbine engine.

DISCLOSURE OF THE INVENTION

An object of the present invention is to provide an air cooled, replaceable composite exhaust liner for gas turbine engines.

According to the invention, the nozzle of a gas turbine engine is lined (tiled) with specially mounted hollow composite blocks. A slot (air passage) is provided between the edge of adjacent blocks to permit cooling air, applied to the interior of the blocks, to escape into the exhaust gas flow along the blocks through the surface of the blocks that the hot exhaust gas flows across to exit from the aircraft. The blocks are arranged end to end along the exhaust nozzle in parallel air flow stacks. Cooling air is applied to the open end of a block at the upstream end of each stack. The stacks create separate, independent cooling airflow paths with some of that air exiting through the slots.

According to the invention, the blocks are cut from a rectangular tube first by making parallel a compound miter cuts to a certain depth on one side of the tube, a step that forms the slot. The tube is then turned 180 degrees and then a miter cut is made through the remaining sides joining with the first cut, giving each block a chevron shape.

According to the invention, to slot has a tapered cross-section with the outlet (to the exhaust gas flow) slightly smaller than the inlet, which is along the insider surface of the block.

According to the invention, the space between the stacks is also cooled with air exiting from the blocks.

According to the invention, each block contains ports or holes to allow some airflow to the space between the stacks.

A feature of the invention is that the liner is exceptionally smooth and light and the blocks can be individually replaced.

Other objects, benefits and features of the invention will be apparent to one skilled in the art from the following discussion.

BRIEF DESCRIPTION OF THE DRAWING

FIG. 4 is an exploded view of FIG. 2.

FIG. 5 a perspective, shows an insert containing a journal bearing and wave spring bearing for a fastener.

FIG. 6 is a perspective showing two resilient, metal separators that are used to separate two composite panels.

BEST MODE FOR CARRYING OUT THE INVENTION

Attaching Composite Sheets and Liner Blocks

Figure 1:
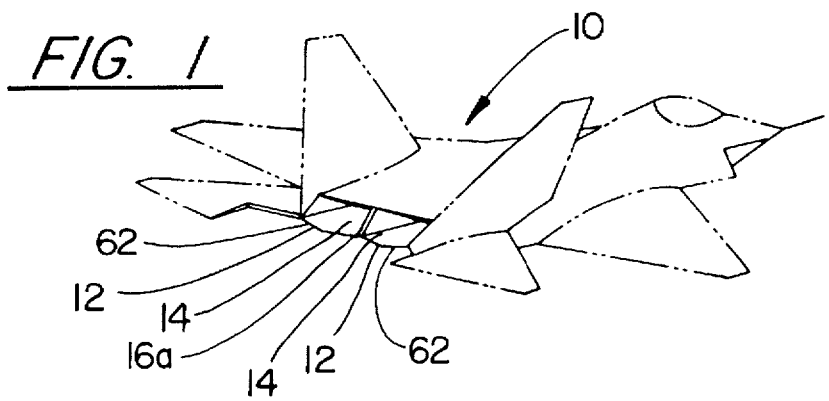
FIG. 1 is a simplified view a typical gas turbine powered (jet) aircraft in which a cooled, ceramic liner embodying the present invention.

In FIG. 1, a jet powered aircraft 10 contains two engines 12, each with its own exhaust 14. As explained below, the exhausts 14 are lined with hollow blocks (reference number 40 in FIG. 7). The engine exhaust environment should be assumed to include panels 16 that are sometimes fastened to each other, as shown in FIG. 2, or fastened to the hollow (for air cooling) blocks 40, an arrangement shown in FIG. 3 and FIG. 7.

Figure 2:
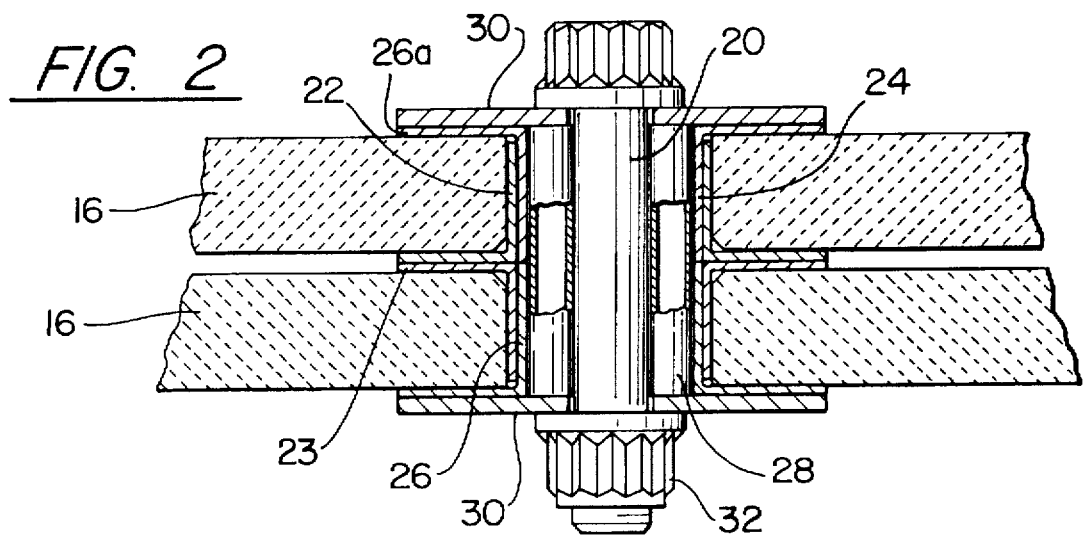
FIG. 2 is a section showing two composite panels that are fastened together according to the present invention.

Referring to FIG. 2, two of the composite sheets 16, which are also shown in FIG. 4, are held together by a bolt 20 that extends through a bore 22 in each panel. Edges 23 actually define the bore. A journal bearing 26 is placed in the bore 22, and a plurality of hollow, thin-walled, springs 28 (bearing tubes) radially support the bolt 20. These bearing tubes 28 extend the length of the journal bearing 26. Being thin walled, they provide resilient radial (lateral) support to the bolt, accommodating thermal expansion and contraction at the bore 22. In addition, this resiliency allows the bolt to shift slightly in the journal bearing 26 as it is inserted. Washer 30 is placed between the bolt cap 31 and flanges 26a on the journal bearing 26. Another washer 30 is also placed in a similar manner beneath a nut 32. FIG. 5 demonstrates another embodiment of the invention described in FIG. 2 and FIG. 4. There, a wave spring 34, made of pliant metal, is inserted between the bolt 20 and the journal bearing 26. The spring 34 may be tack-welded in the journal bearing 26 at locations 38, holding it in place.

Figure 3:
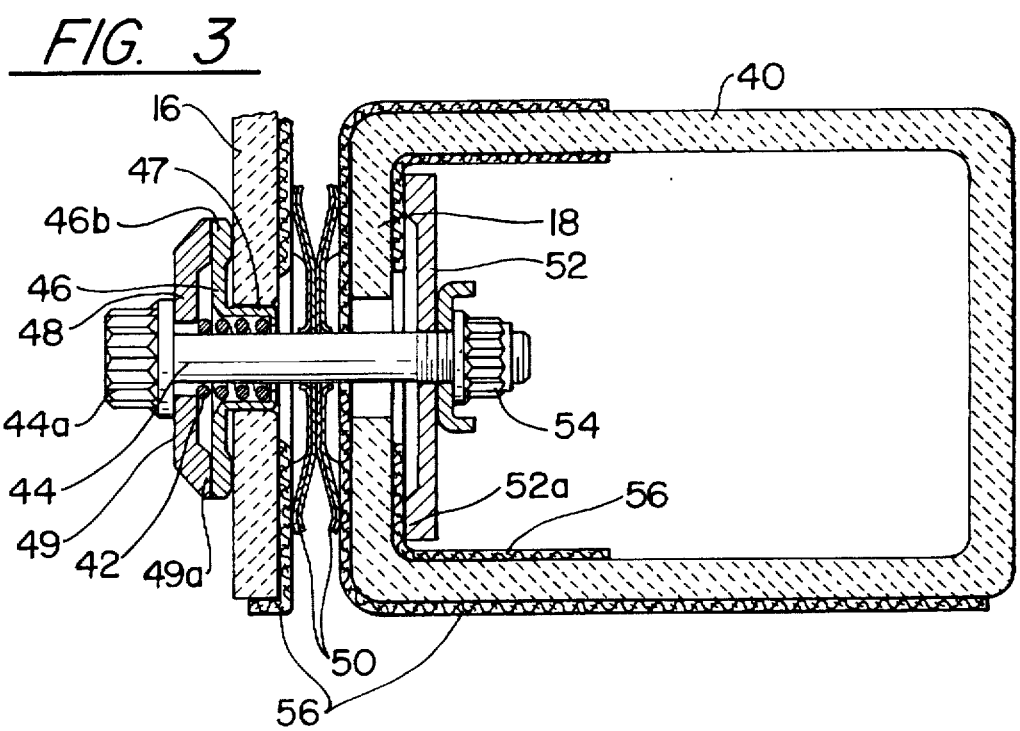
FIG. 3 is a section showing a composite (e.g. ceramic) sheet attached to a composite liner according to the present invention.

Turning now to FIG. 3, another embodiment of the invention is illustrated. Once again a composite (ceramic) sheet 16 is used, but in FIG. 3, it is attached to a four sided ceramic block 40, hollow in the center to receive cooling air. The block is used to line an exhaust nozzle 10a at the end of the exhaust 10. The nozzle 10a is not shown in detail. Many jet engines in use have lined nozzles, though not lined as prescribed by this invention. Annular springs 42 separate the bolt 44 from a journal bearing 46 that fits inside the bore 47 in the sheet 16. These springs 42, appearing as small, hollow, metal o-rings, are actually made of a tightly wound helical spring that is formed to be circular in plan and cross section (as shown). Such springs are made by Furon, Corp of Los Alimitos, Calif. They provide a similar type of support to that provided by the bearings 28 in FIG. 4; that is, they can be squeezed side to side (radial movement), which prevents stress buildup in the bore as the liner block 40 heats, along with the bolt 44. The springs 42 also accommodate some axial movement by the bolt in the journal bearing. The journal bearing 46 contains a flange 46a with a circumferential land 46b that presses against the sheet 16 at some radial distance from the bore 47, which prevents stress concentration near the edge of the bore. Likewise, a washer 49, between the bolt head 44a and the journal bearing flange 46a also contains a circumferential land 49a that engages only the land 46b. As a result, the compression force from the bolt is applied at some radial distance away from the bore.

FIG. 6 shows in greater detail the two somewhat concave spacers 50 that are located between sheet 16 and line block 40. Due to the tabs 50a, which give the spacers a concave cross-section, they compress as the bolt 44 is tightened. Another washer 52 also has a circumferential flange 52a to apply the compression load a some radial distance away from the bore 47 as the nut 54 is tightened. To avoid damage to the composite's surface by the concave spacers 50 and the washer 52, the surface is covered with a fiber mat impregnated with a resilient material 56, e.g., Nextel brand fiber in RTV. The spacers 50, it will noticed, accommodate axial (the direction of the bolt axis) movement between the block 40 and the sheet 16 and some movement normal to that direction (radially at the bolt 44).

The Liner Blocks

Figure 7:
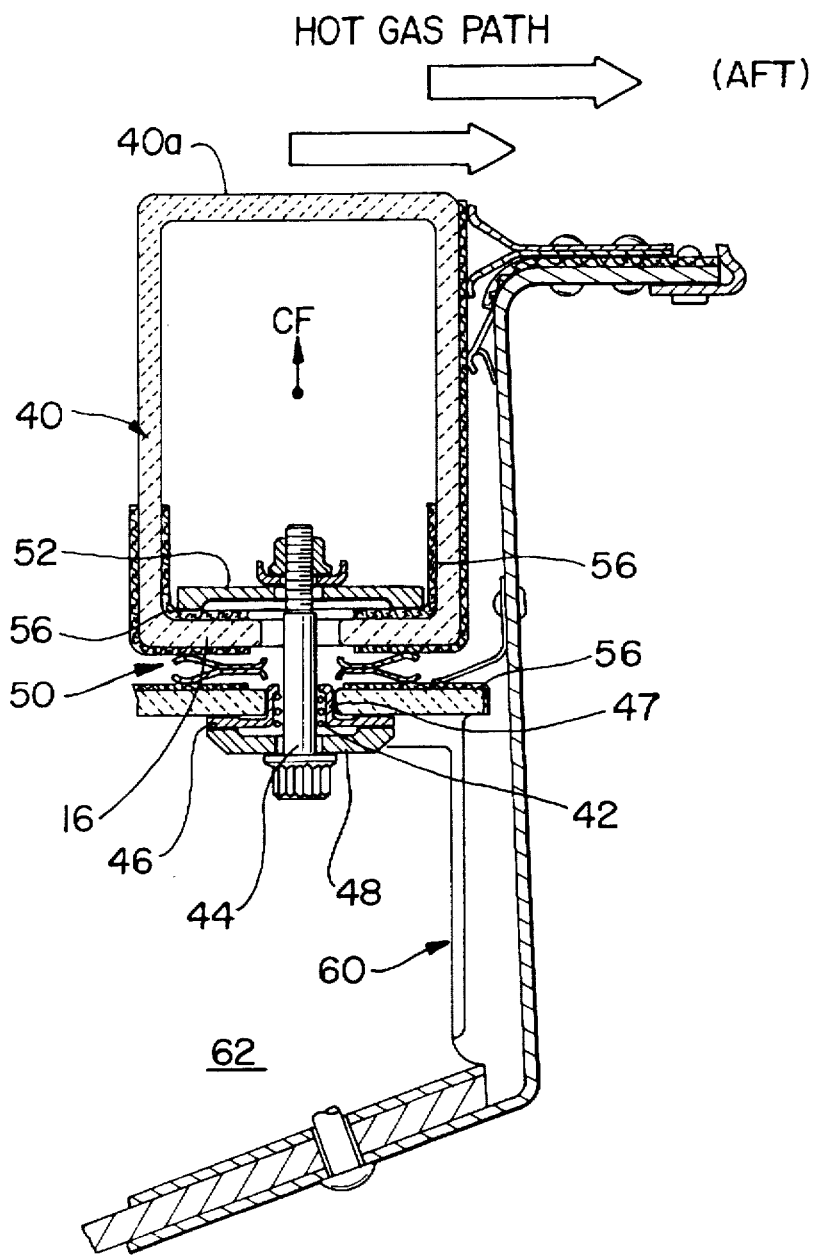
FIG. 7 is a perspective of an exhaust liner tile mounting arrangement that embodies the present invention.
Figure 8:
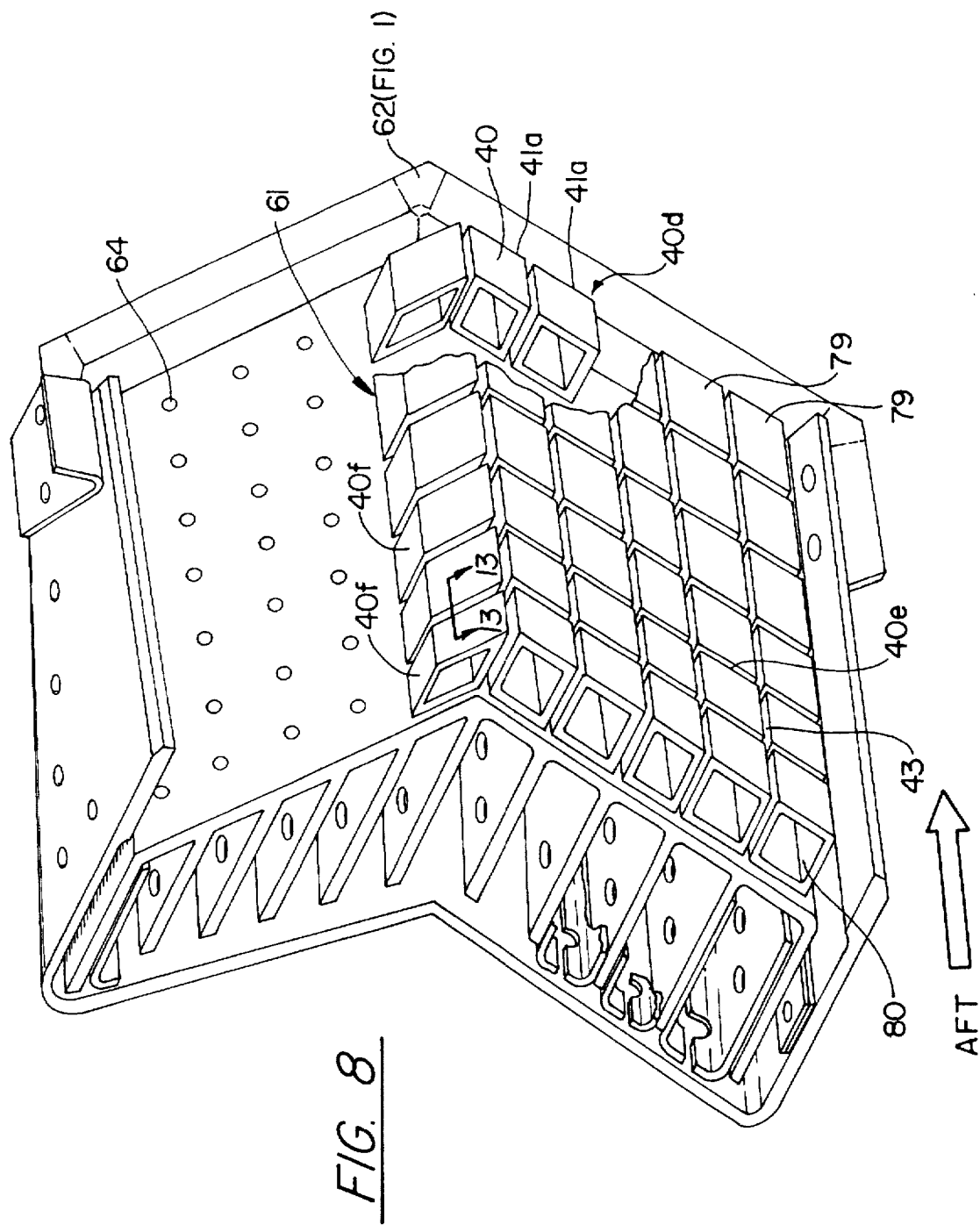
FIG. 8 is a perspective of an exhaust partially lined with liner blocks according to the present invention.
Figure 12:
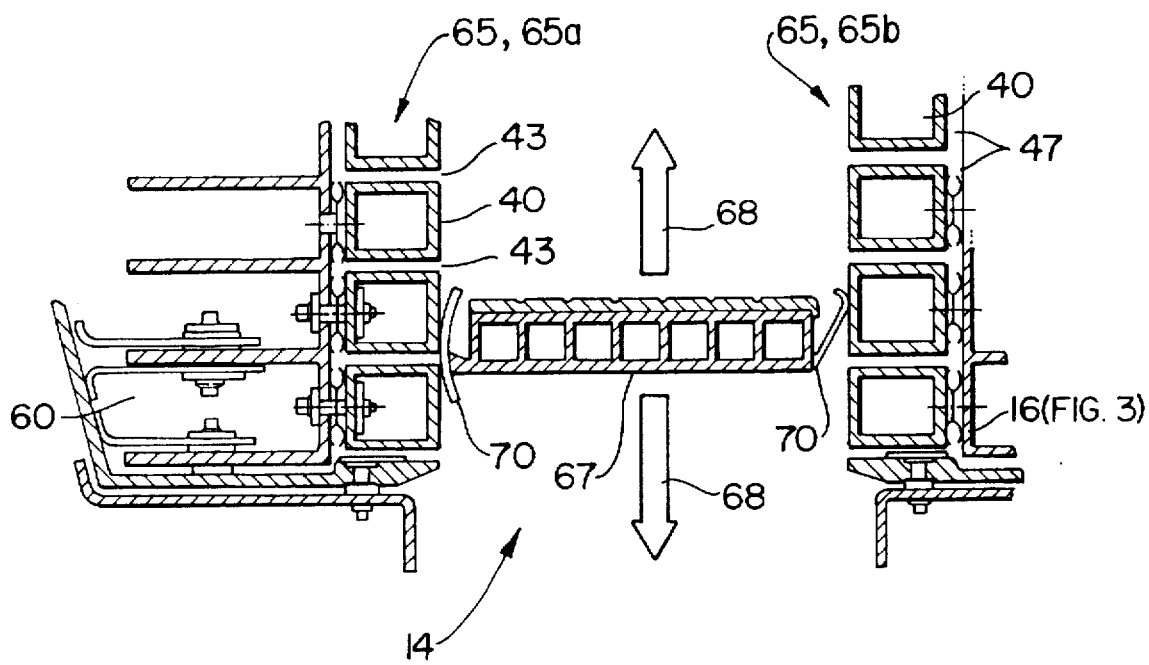
FIG. 12 shows a cross-section of part of the exhaust for the left engine in the aircraft shown in FIG. 1.

FIG. 7 shows one block 40 attached to an aircraft fuselage 60 (see also FIG. 1) using the special attaching and hardware described in the previous section of this discussion. The block 40, hollow to receive cooling airflow (see the vector point CF, normal to the page), protects the fuselage 60 and fuselage interior portion 62 from hot exhaust gas that flows by the tile surface 48. Reference can be made to FIG. 8 to see that a liner section 61 contains many liner blocks 40 in parallel rows or "stacks" that are separated by a small space 43. It can be assumed that each of these blocks 40 is attached in the manner shown in FIGS. 3 and 7. For purposes of clarity, it should be understood that the arrow "aft" in FIG. 7 shows the direction of exhaust gas flow and that the triangular or tapered end 62 in FIG. 8 is at the extreme end of the engine. (See also FIG. 1.) Each of the holes 64 receives one of the bolts 44 to a block 40 to the fuselage section 60. Referring to FIG. 12, the blocks 40 line each side 65 of an exhaust nozzle containing one of two "divergent flap" 67, which may move up an down (arrow 68) to control exhaust nozzle thrust direction as part of a so-called "thrust vectoring nozzle". Because FIG. 12 shows only the lower half of the exhaust, the second flap 67 is not shown. The flap 67 contains, on each side, skid-like tensioned seals 70 that slide along the blocks 40. In FIG. 12, it should be observed that the attachment mechanism for the blocks 40 on the left hand side 65a uses the hardware shown in FIG. 7. The blocks 40, on the other hand, that are on the right hand side 65b use the hardware shown in FIG. 3. The reason is that the right hand side 65b corresponds structurally to the composite wall 16a separating the two exhausts (shown in FIG. 1).

Figure 9:
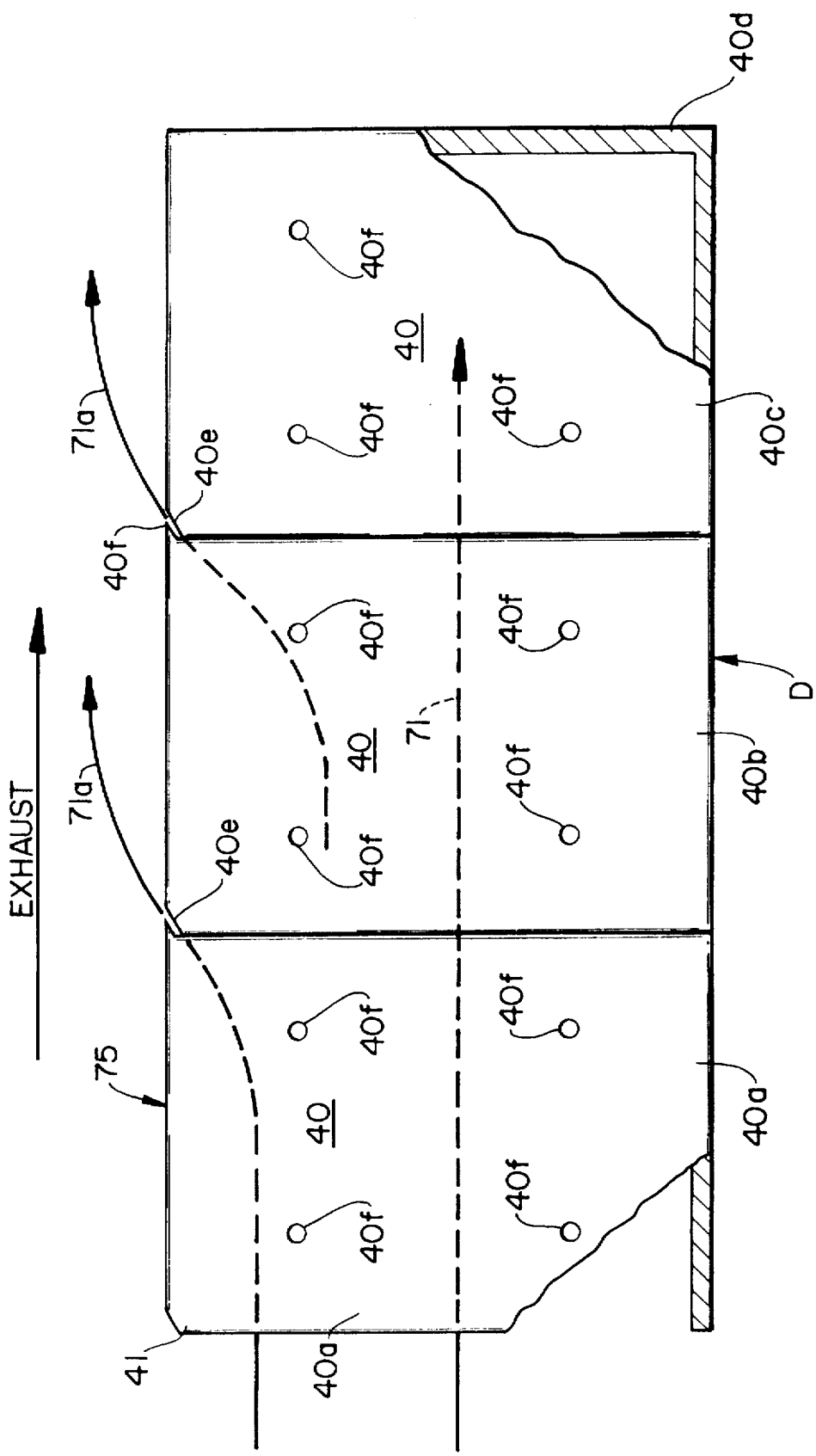
FIG. 9 is an elevation showing three ceramic exhaust liner tiles or blocks according to the present invention as viewed.
Figure 13:
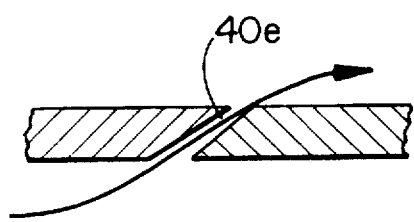
FIG. 13 is a section taken along line 13—13 in FIG. 8, showing the miter connection between two adjacent line blocks.

FIG. 9 shows three of the liner blocks 40 in an elevation taken in the direction of a miter cut (made to construct the individual blocks from a single rectangular tube). To some extent, this angle of view obscures the chevron shape to each block, which may be easier to see from FIG. 8. Cooling airflow (arrow 71) is applied to the open end 41 of one liner block 40a. The cooling airflow flows through the interior of this and the other blocks 40b and 40c. Block 40c, however, has a wall 40d, this being at the end of the nozzle or the farthest downstream location at the end of the aircraft 10. Special attention should be directed to the exhaust facing sides 75 of the liner blocks 40a, 40b, 40c. These are different from the other sides of the blocks in that there is a transverse slot 40e (airflow passage), creating for cooling air from the interior of the blocks into the exhaust flow. This slot is shown in detail in FIG. 13, where it should be seen that it is slightly tapered, its outlet being smaller than the inlet in the interior of the block, and that the slot is oriented downstream, e.g. 30 degrees from normal. Arrow 71 shows the cooling airflow. The airflow through the slot 40e is shown by the arrow 71a. In addition, there are holes (air passages) 40f on the sides of the blocks 40, to provide some cooling airflow to the space 43 between the stacks 79. Consequently, the overall cooling airflow is one by which cooling air is forced at location 80 into each row 79 of interlocked blocks 40 in FIG. 8, then flows towards the rear wall 40d with some of that airflow exiting into the hot exhaust flow through port or slot 40e and a fraction exiting from the ports 40f. In addition to the slot 40e, each block contains air flow passages 40f on the block wall on each side of the space that separates adjacent rows of blocks. These passages 40f allow some of the cooling air to escape into that space.

Figure 10:
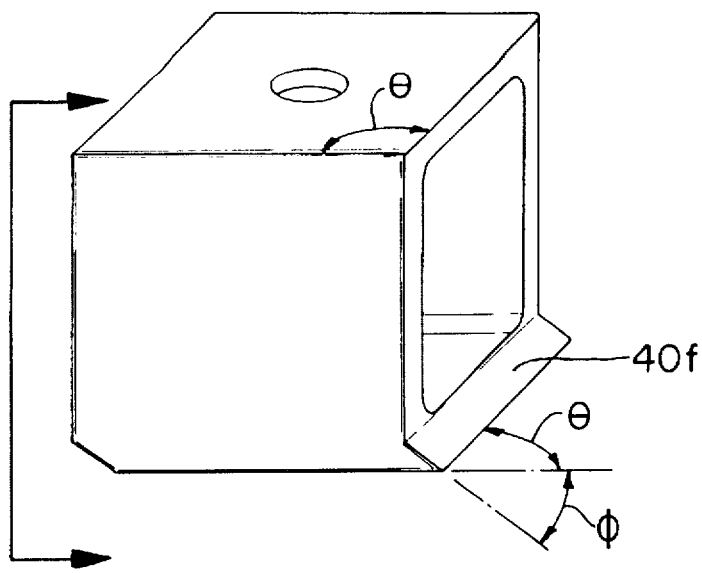
FIG. 10 is a perspective of one of the chevron-shaped blocks.
Figure 14:
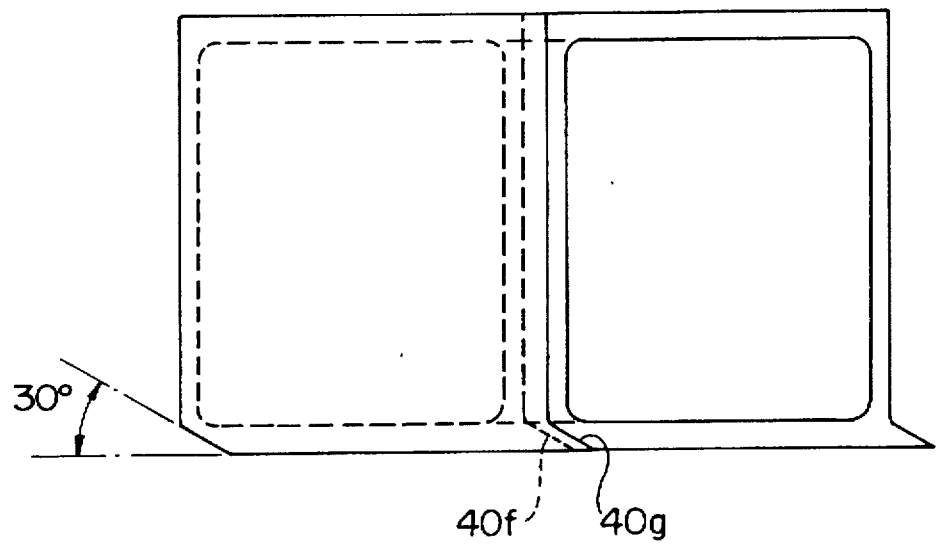
FIG. 14 shows two adjacent blocks.
Figure 11:
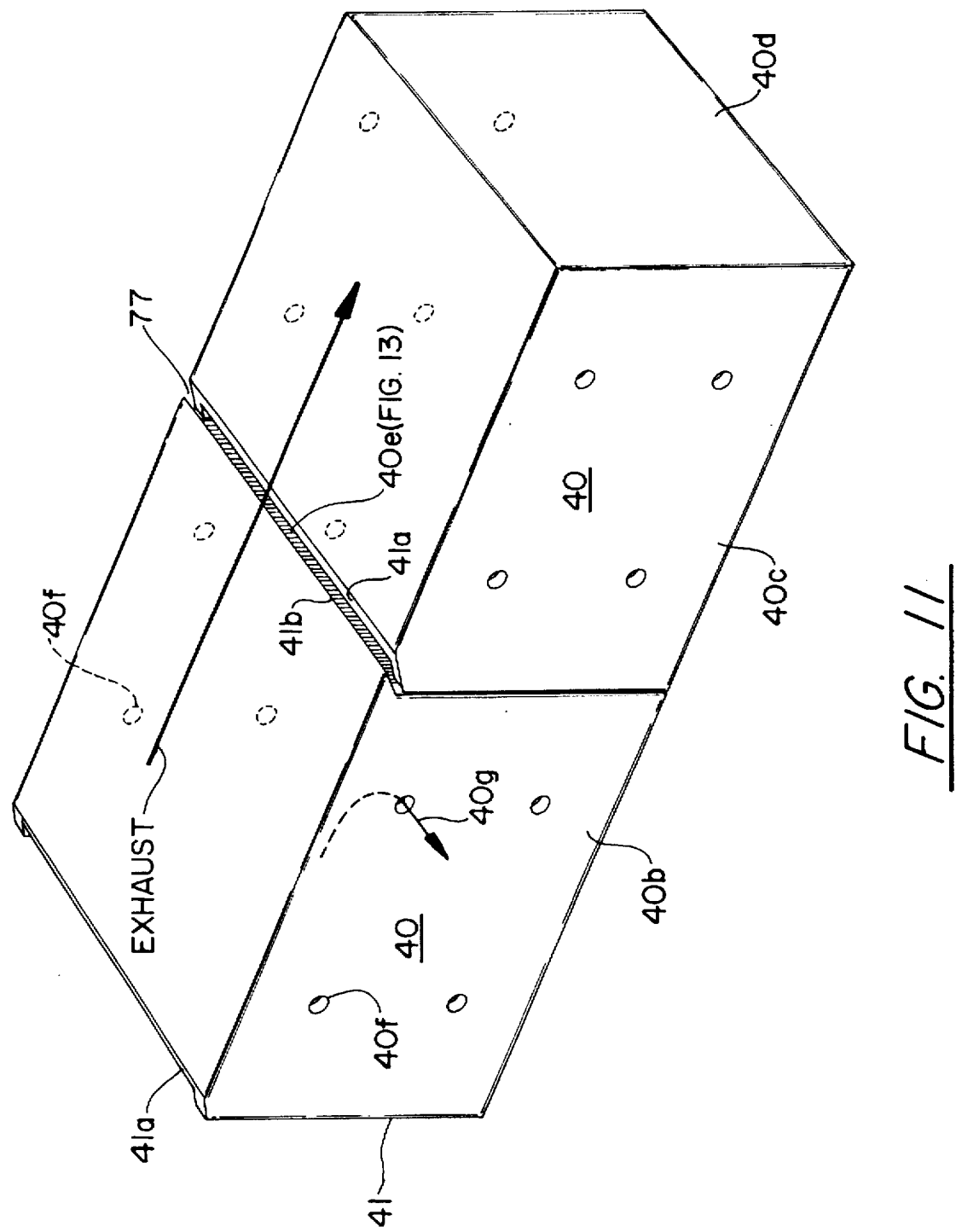
FIG. 11 is a perspective of two adjacent cooling blocks.
Figure 15:
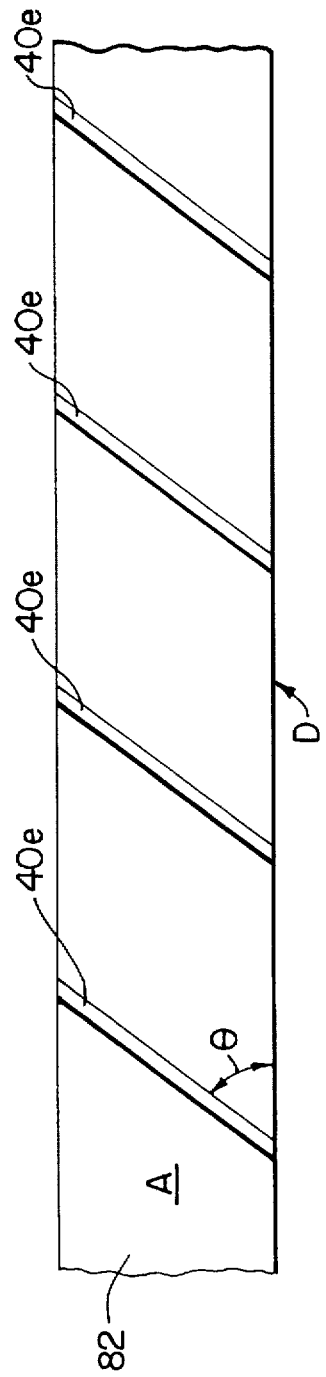
FIG. 15 is a plan view of the rectangular tube with the compound miter cuts that form the slots.
Figure 16:
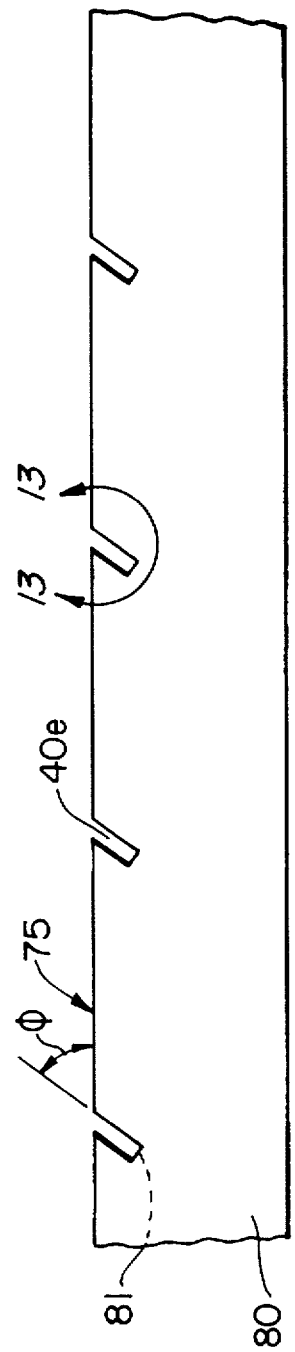
FIG. 16 is an elevation of the rectangular tube shown in FIG. 15.

Referring to FIGS. 15 and 16, the blocks 40 are cut from a single rectangular. First, the slots 40e are formed by making a plurality of parallel, compound miter cuts at an angle $\theta$ (e.g. 30 degrees to one wall D and $\phi$ (e.g. 30 degrees) to the side 75. Then the tube is rotated 180 degrees and a miter cut, only at $\theta$, is made, but completely through the tube 80 so as to meet the slot 40e. The second cut forms one block 40 from the tube 80. The slot 40e thus points slightly aft in the direction of the exhaust flow. As explained previously, the slot 40e is tapered in such a way the inlet is wider than the outlet. This may be done by machining once the blocks have been cut from the rectangular tube 80. FIG. 10 shows one block 40, and there, the surface 40h defines one side of the slot 40e, the other being surface 40i on the adjacent block, as shown in FIG. 14. The width 40j of the surface 40g is related to the thickness of the cutting instrument, e.g. a saw blade, when the the second miter cut reaches the slot.

With the benefit of this explanation of the invention, one of ordinary skill in the art may be able to make modifications, in whole or in part, to a described embodiment of the invention without departing from the true scope and spirit of the invention.

We claim:

1. A gas turbine characterized by:

parallel rows of airflow stacks comprising first and second end to end hollow blocks, each of said first and second blocks being individually attached to an exhaust wall by a removable fastener, said first block having an open end butting against an open end of said second block to form one of said airflow stacks; and a cooling air passage between said open ends that comprises a slot cut in opposed butting ends of said blocks, said slot leading from an interior of said first and second blocks to coplanar surfaces of said first and second blocks that receive engine exhaust gas flow.

2. A gas turbine engine as described in claim 1, further characterized in that:

said slot has an inlet area greater than an outlet area.

3. A gas turbine engine as described in claim 2, further characterized in that:

said slot is oriented at an angle in a direction of said engine exhaust flow.

4. A gas turbine engine as described in claim 1, further characterized in that:

said first and second blocks contain air passages in opposing walls, said walls facing adjacent walls of hollow blocks in an adjacent one of said parallel airflow stacks, said adjacent walls comprising air passages aligned with said air passages in said opposing walls for providing air flow between said parallel rows of air flow stacks.

5. A gas turbine engine characterized by:

parallel rows of airflow stacks comprising first and second end to end hollow blocks, said first and second blocks being individually attached to an exhaust wall by a removable fastener said first block having an open end butting against an open end of said second block to form one of said airflow stacks; and a cooling air passage for airflow from an interior of the blocks, said passage comprising a slot between opposed open ends of said blocks, said slot extending across a block surface facing engine exhaust flow in a direction normal to said engine exhaust flow.

6. A gas turbine engine as described in claim 5, further characterized by:

air passages in walls of said blocks, said walls being normal to said block surface.

* * * * *